United States Patent
Wu et al.

(10) Patent No.: US 10,037,590 B2
(45) Date of Patent: Jul. 31, 2018

(54) LOW-POWER GRAPHICS PROCESSING USING FIXED-FUNCTION UNIT IN GRAPHICS PROCESSING UNIT

(71) Applicant: VIA Alliance Semiconductor Co., Ltd., Shanghai (CN)

(72) Inventors: Fengxia Wu, Shanghai (CN); Yuanfeng Wang, Shanghai (CN); Zhou Hong, Cupertino, CA (US); Heng Que, Shanghai (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 226 days.

(21) Appl. No.: 14/836,102

(22) Filed: Aug. 26, 2015

(65) Prior Publication Data
US 2016/0379334 A1 Dec. 29, 2016

(30) Foreign Application Priority Data
Jun. 29, 2015 (CN) .......................... 2015 1 0366715

(51) Int. Cl.
*G06T 1/20* (2006.01)
*G06T 7/50* (2017.01)
(Continued)

(52) U.S. Cl.
CPC .............. *G06T 1/20* (2013.01); *G06F 1/3287* (2013.01); *G06T 1/60* (2013.01); *G06T 7/50* (2017.01);
(Continued)

(58) Field of Classification Search
None
See application file for complete search history.

(56) References Cited

U.S. PATENT DOCUMENTS 8,174,534 B2   5/2012   Jiao
8,199,155 B2   6/2012   Leroy et al.
(Continued)

FOREIGN PATENT DOCUMENTS

CN   104050706 A   9/2014
EP   2 037 417     3/2009
(Continued)

OTHER PUBLICATIONS

European Search Report dated Nov. 16, 2016, issued in application No. 15189498.7-1972.

*Primary Examiner* — Michael J Cobb
(74) *Attorney, Agent, or Firm* — McClure, Qualey & Rodack, LLP

(57) ABSTRACT

A graphics processing unit and associated graphics processing method are provided. The graphics processing unit includes: an execution unit, for performing shader execution and texture loading; a fixed-function unit, for executing a graphics rendering pipeline; a memory-access unit; a texture unit, for reading texture data from a memory via the memory-access unit according to the data requirement of the execution unit or the fixed-function unit; and a command stream parser, for receiving a draw command from a display driver, and transmitting the draw command to the execution unit or the fixed-function unit to perform graphics processing according to the type of draw command. When the command stream parser determines that the draw command is a specific draw command, the command stream parser transmits the draw command only to the fixed-function unit to perform graphics processing, and turns off power to the execution unit.

8 Claims, 3 Drawing Sheets

(51) Int. Cl.
  *G06F 1/32*    (2006.01)
  *G06T 1/60*    (2006.01)
  *G06T 11/00*   (2006.01)
  *G06T 11/20*   (2006.01)
  *G06T 11/60*   (2006.01)
  *G09G 5/10*    (2006.01)

(52) U.S. Cl.
  CPC ............ *G06T 11/001* (2013.01); *G06T 11/20* (2013.01); *G06T 11/60* (2013.01); *G09G 5/10* (2013.01); *G09G 2330/021* (2013.01); *Y02D 10/171* (2018.01)

(56) References Cited

U.S. PATENT DOCUMENTS

| | | |
|---|---|---|
| 8,681,162 B2 | 3/2014 | Paltashev et al. |
| 9,286,647 B2 | 3/2016 | Lum et al. |
| 2002/0075251 A1* | 6/2002 | Millman ............... G06F 1/3203 345/211 |
| 2009/0147017 A1* | 6/2009 | Jiao ........................ G06T 15/04 345/582 |
| 2010/0123717 A1 | 5/2010 | Jiao |
| 2010/0295852 A1 | 11/2010 | Yang et al. |
| 2013/0155080 A1 | 6/2013 | Nordlund et al. |
| 2014/0267318 A1 | 9/2014 | Lum et al. |
| 2015/0178974 A1* | 6/2015 | Goel ........................ G06T 1/20 345/420 |

FOREIGN PATENT DOCUMENTS

| | | |
|---|---|---|
| TW | 200834298 | 8/2008 |
| TW | 200926050 | 6/2009 |
| TW | 201020965 | 6/2010 |
| TW | 201216200 | 4/2012 |

\* cited by examiner

LOW-POWER GRAPHICS PROCESSING USING FIXED-FUNCTION UNIT IN GRAPHICS PROCESSING UNIT

CROSS REFERENCE TO RELATED APPLICATIONS

This application claims priority of China Patent Application No. 201510366715.3, filed on Jun. 29, 2015, the entirety of which is incorporated by reference herein.

BACKGROUND OF THE INVENTION

Field of the Invention

The present invention relates to a graphics processing unit, and, in particular, to a graphics processing unit and an associated graphics processing method capable of using a specific draw command to reduce power consumption of an execution unit in the graphics processing unit.

Description of the Related Art

With advances in technology, mobile devices have become more and more popular, and smartphones play an important role in our daily lives. However, the charging capability of the battery in a smartphone is a very important topic, and thus designers have to develop various methods to reduce power consumption of the smartphone.

In the smartphone, the graphics processing unit (GPU) is a very important computation component. Generally, the power consumption of the GPU is very high, and thus the power consumption of the GPU should be reduced as much as possible to increase the battery service time of the smartphone.

BRIEF SUMMARY OF THE INVENTION

A detailed description is given in the following embodiments with reference to the accompanying drawings.

In an exemplary embodiment, a graphics processing unit is provided. The graphics processing unit comprises: an execution unit, for performing shader execution and texture loading; a fixed-function unit, for executing a graphics rendering pipeline; a memory-access unit; a texture unit, for reading texture data from a memory via the memory-access unit according to the data requirements of the execution unit or the fixed-function unit; and a command stream parser, for receiving a draw command from a display driver, and transmitting the draw command to the execution unit or the fixed-function unit to perform graphics processing according to the type of draw command. When the command stream parser determines that the draw command is a specific draw command, the command stream parser transmits the draw command only to the fixed-function unit to perform graphics processing, and turns off power to the execution unit.

In another exemplary embodiment, a graphics processing method for use in a graphics processing unit is provided. The graphics processing unit comprises an execution unit for performing shader execution and texture loading, and a fixed-function unit for executing a graphics rendering pipeline. The method comprises the steps of: determining whether a draw command received by the graphics processing unit from a display driver is a specific draw command; and when it is determined that the draw command is a specific draw command, transmitting the draw command only to the fixed-function unit to perform graphics processing, and turning off power to the execution unit.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
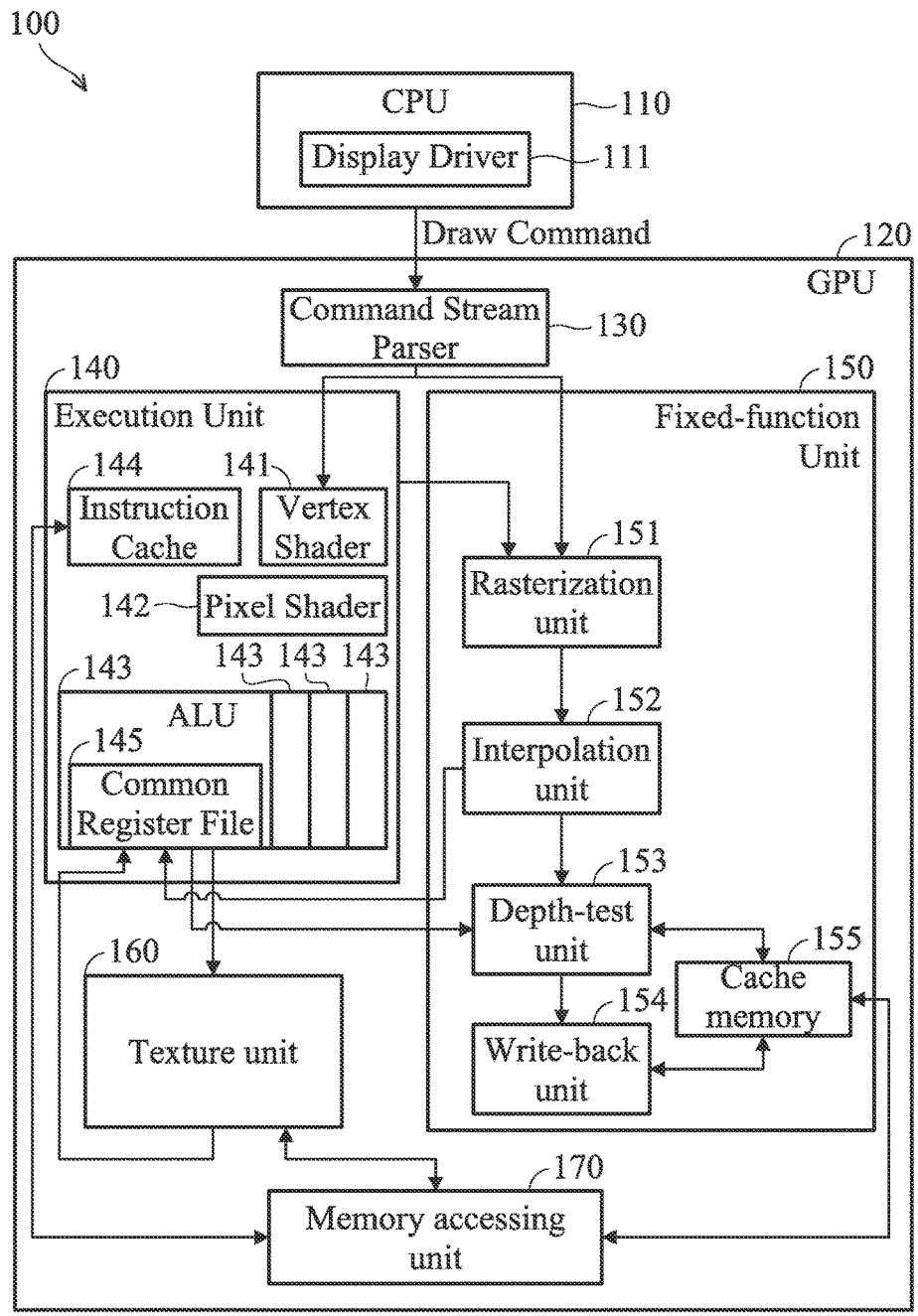
FIG. 1 is a block diagram of a computer system in a portable device in accordance with an embodiment of the invention.

FIG. 1 is a block diagram of a computer system in a portable device in accordance with an embodiment of the invention. As shown in FIG. 1, the computer system 100 comprises a central processing unit (CPU) 110 and a graphics processing unit (GPU) 120, wherein the GPU 120 and the display driver 111 executed by the CPU 110 supports the OpenGL ES standard. The GPU 120 comprises a command stream parser 130, an execution unit 140, a fixed-function unit 150, a texture unit 160, and a memory-access unit 170. The command stream parser 130 of the GPU 120 receives a draw command from the display driver 111 executed by the CPU 110 of the computer system 100, and the command stream parser 130 directly transmits the received draw command to the execution unit 140. The execution unit 140 performs graphics processing tasks such as shader execution and texture loading. The fixed-function unit 150 is configured to perform calculations in the graphics rendering pipeline, such as rasterization, depth test, etc. The texture unit 160 reads texture data required by the execution unit 140 from the memory via the memory-access unit 170.

In an embodiment, the execution unit comprises a vertex shader 141, a pixel shader 142, a plurality of arithmetic logic units (ALU) 143, an instruction cache 144, and a common register file. The vertex shader 141 is configured to build triangles or polygons according to vertex information of the object to be displayed. The pixel shader 142 is configured to process each pixel and alternate associated color components according to color characteristics. For example, the pixel shader 142 may determine the color value for reflection or mirroring, and transparency value according to the position of the light source and the normal line of the vertex. The ALU units 143 perform various calculations associated with the draw command. The instruction cache 144 stores the instructions associated with the draw command. The common register file 145 is configured to store the graphics data to be transmitted to the fixed-function unit 150 and the texture data read by the texture unit 160.

The fixed-function unit 150 comprises a rasterization unit 151, an interpolation unit 152, a depth-test unit 153, a write-back unit 154, and a cache memory 155. Specifically, when the vertex shader 141 has completed shader processing, the vertex shader 141 transmits the processed graphics data to the rasterization unit 151 of the fixed-function unit 150 to perform rasterization. The graphics data processed by the rasterization unit 151 are transmitted to the common register file 145 of the execution unit 140 through the interpolation unit 152. The pixel shader 142 performs pixel shading on the rasterized graphics data stored in the common register file 145, and the shaded pixel data will be transmitted to the depth-test unit 153 of the fixed-function unit 150 to perform a depth test. Then, the write-back unit 154 performs blending on the depth-tested pixel data, and stores the picture data to be displayed in a display memory through the cache memory 155 via the memory-access unit 170.

It should be noted that only the execution unit 140 has an interface to communicate with the fixed-function unit 150 when processing a common draw command, and the execution unit 140 should always be turned on.

Figure 2:
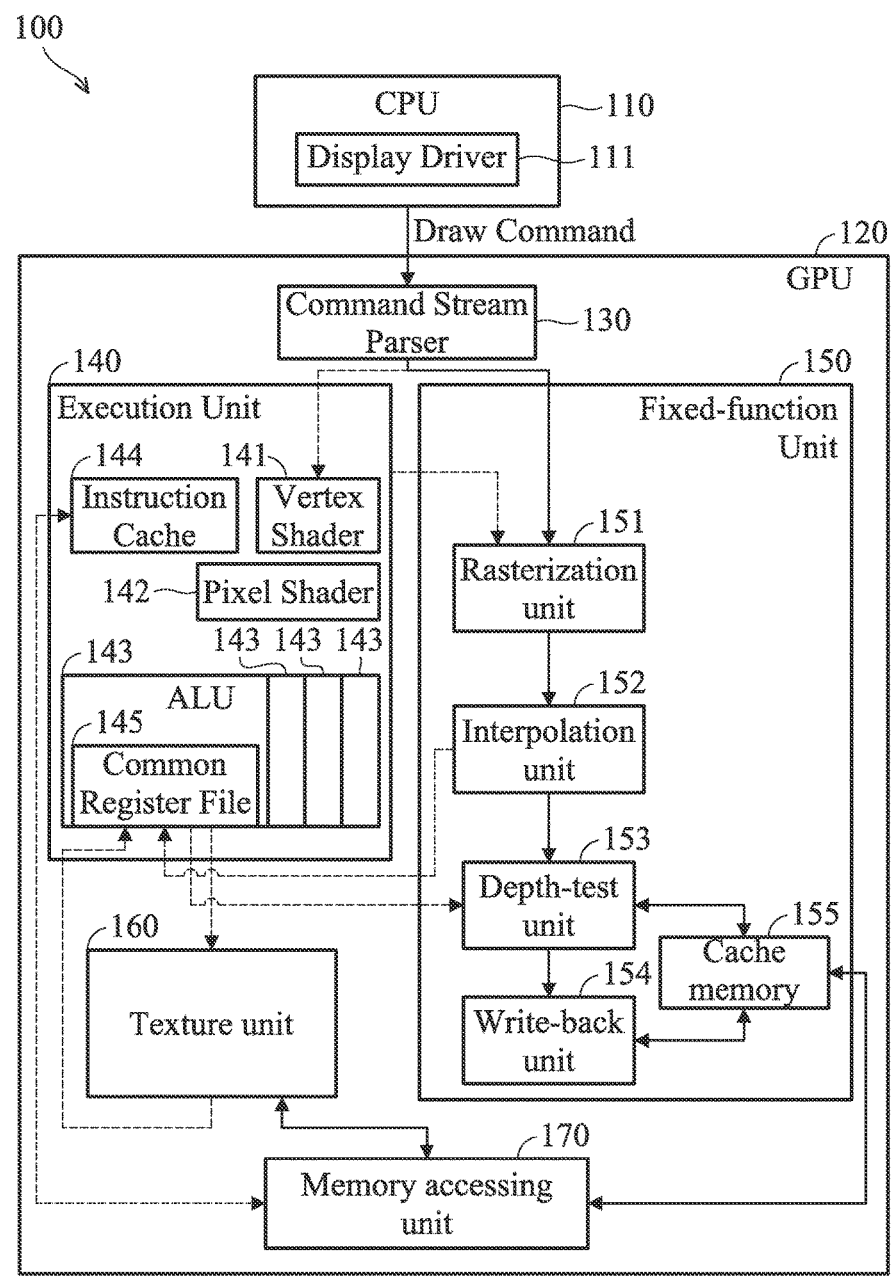
FIG. 2 is a block diagram of the computer system of the portable device in accordance with another embodiment of the invention.

FIG. 2 is a block diagram of the computer system of the portable device in accordance with another embodiment of the invention. Referring to FIG. 2, another procedure to process the graphics data is disclosed. It should be noted that some data paths and control paths in FIG. 1, which are drawn in dashed lines, are not used in FIG. 2. In another embodiment, the CPU 110 analyzes the pictures being displayed by each application running on the portable device, and categorizes different fixed patterns for shaders, texture loading, and blending. For example, the vertex buffer (not shown) and the vertex shader 141 are relatively simple in some specific conditions, such as using big triangles with simple transformation and a few basic texture loading operations. In addition, the pixel shader 142 only performs some basic blending operations in the aforementioned specific conditions, and these basic blending operations can be converted to frequently used functions by the fixed-function unit 150.

Specifically, the display driver 111 executed by the CPU 110 determines whether the draw command and the blending mode corresponding to the picture to be displayed by the application meet the aforementioned specific conditions, such as determining whether the draw command and the blending mode belong to some primitive types or some specific attribute binding patterns. If so, the display driver 111 executed by the CPU 110 converts the common draw command designed for execution by the execution unit 140 to a specific draw command which can be directly executed by the fixed-function unit 150, and transmits the specific draw command to the graphics processing unit 120. When the command stream parser 130 has received the specific draw command from the display driver 111, the command stream parser 130 directly transmits the specific draw command only to the fixed-function unit 150. Meanwhile, subsequent graphics processing are executed by the fixed-function unit 150, and the command stream parser 130 further turns off power to the execution unit 140 to reduce power consumption.

Specifically, when the display driver 111 is to convert the common draw command designed for execution by the execution unit 140 to the specific draw command being directly executed by the fixed-function unit 150, the display driver 111 encodes the screen coordinates, color information, and texture coordinates to the specific draw command. Accordingly, the rasterization unit 151 of the fixed-function unit 150 may perform rasterization on the data in the specific draw command. Then, the color information is output to the write-back unit 154 after interpolation by the interpolation unit 152. The texture coordinates are output to the texture unit 160 after interpolation by the interpolation unit 152. The texture unit 160 performs texture sampling and filtering to generate texture data, and transmits the texture data to the write-back unit 154. In addition to interpolating texture coordinates, the interpolation unit 152 may also perform interpolation on other attributes.

The write-back unit 154 synchronously receives data from the interpolation unit 152 and the texture unit 160, and performs blending calculations according to the blending mode designated by the display driver 111. At last, the write-back unit 154 writes the blended graphics data to the display memory through the cache memory 155 via the memory-access unit 170.

Figure 3:
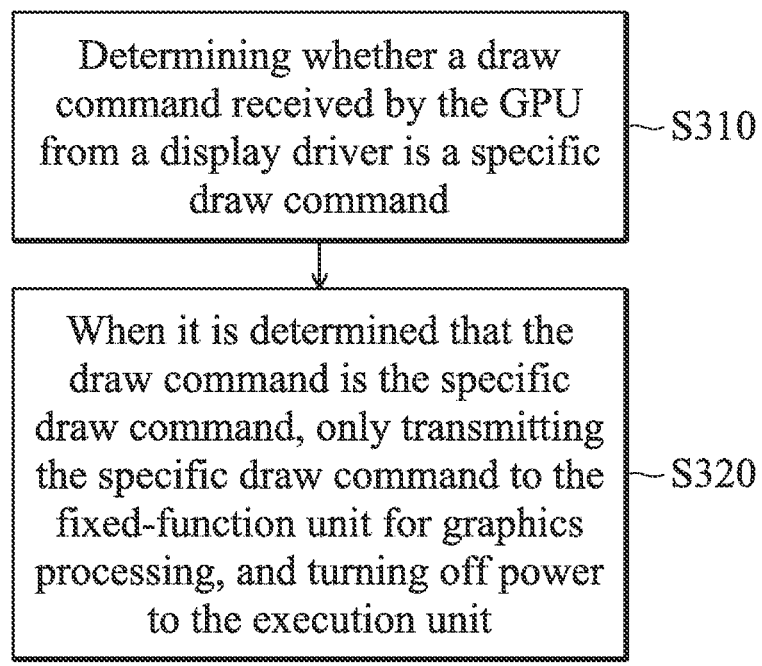
FIG. 3 is a flow chart of a graphics processing method in accordance with an embodiment of the invention.

FIG. 3 is a flow chart of a graphics processing method in accordance with an embodiment of the invention. In step S310, it is determined whether a draw command received by the CPU 120 from the display driver 111 is a specific draw command. In step S320, when it is determined that the draw command is a specific draw command, transmitting the specific draw command only to the fixed-function unit 150 to perform graphics processing, and the power to the execution unit 140 is turned off.

In view of the above, a graphics processing unit, and an associated graphics processing method are provided in the invention. When the picture to be displayed matches a specific type, the display driver converts the draw command into a specific draw command executed by the fixed-function unit, and the power to the execution unit is turned off by the command stream parser 130 to reduce power consumption.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A graphics processing unit, comprising:
   an execution unit, for performing vertex shading, pixel shading, and texture loading;
   a fixed-function unit, for executing a graphics rendering pipeline;
   a memory-access unit;
   a texture unit, for reading texture data from a memory via the memory-access unit according to data requirement of the execution unit or the fixed-function unit; and
   a command stream parser, for receiving a draw command from a display driver, and transmitting the draw command to the execution unit or the fixed-function unit to perform graphics processing according to type of draw command, wherein the type of draw command is one of a specific draw command and a common draw command;
   wherein when the command stream parser determines that the draw command is a specific draw command, the command stream parser transmits the draw command only to the fixed-function unit to perform graphics processing, and turns off power to the execution unit,
   wherein when the command stream parser determines that the draw command is a common draw command, the command stream parser transmits the draw command to the execution unit,
   wherein when the display driver determines that the draw command and a blending mode of an image to be displayed belong to specific primitive types, the display driver converts the draw command from a common draw command to a specific draw command which can be directly executed by the fixed-function unit, and transmits the specific draw command to the graphics processing unit.

2. The graphics processing unit as claimed in claim 1, wherein the specific draw command comprises screen coordinates, color information, and texture coordinates of an area to be displayed.

3. The graphics processing unit as claimed in claim 1, wherein when the draw command is the common draw command, the command stream parser activates the execution unit to perform graphics processing together with the fixed function unit.

4. The graphics processing unit as claimed in claim 2, wherein the fixed-function unit comprises:
   a rasterization unit, configured to perform rasterization on first graphics data of the specific draw command to generate second graphics data;
   an interpolation unit, configured to perform interpolation on the texture coordinates and transmit the interpolated texture coordinates to the texture unit to perform texture sampling and filtering to generate third graphics data;
   a depth-test unit, configured to perform a depth test on the second graphics data; and
   a write-back unit, configured to perform blending on the third graphics data and the color information from the interpolation unit to generate output display data, and writes the output display data to a display memory via the memory-access unit, wherein, the interpolation unit can also perform interpolation on other attributes.

5. A graphics processing method for use in a graphics processing unit, wherein the graphics processing unit comprises an execution unit for performing vertex shading, pixel shading and texture loading, and a fixed-function unit for executing a graphics rendering pipeline, the method comprising:
   determining whether a draw command received by the graphics processing unit from a display driver is a specific draw command or a common draw command; and
   when it is determined that the draw command is a specific draw command, transmitting the draw command only to the fixed-function unit to perform graphics processing, and turning off power to the execution unit,
   when it is determined that the draw command received by the graphics processing unit from the display driver is a common draw command, transmitting the draw command to the execution unit to perform graphics processing, and
   wherein when the display driver determines that the draw command and a blending mode of an image to be displayed of the draw command belong to specific primitive types, the display driver converts the draw command from a common draw command to a specific draw command which can be directly executed by the fixed-function unit, and transmits the specific draw command to the graphics processing unit.

6. The method as claimed in claim 5, wherein the specific draw command comprises screen coordinates, color information, and texture coordinates of an area to be displayed.

7. The method as claimed in claim 5, when it is determined that the draw command is a common draw command, the command stream parser activates the execution unit to perform graphics processing together with the fixed function unit.

8. The method as claimed claim 5, wherein the fixed-function unit comprises:
   a rasterization unit, configured to perform rasterization on first graphics data of the specific draw command to generate second graphics data;
   an interpolation unit, configured to perform interpolation on the texture coordinates and
   transmit the interpolated texture coordinates to the texture unit to perform texture sampling and filtering to generate third graphics data;
   a depth-test unit, configured to perform a depth test on the second graphics data; and
   a write-back unit, configured to perform blending on the third graphics data and the color information from the interpolation unit to generate output display data, and writes the output display data to a display memory via the memory-access unit,
   wherein, the interpolation unit can also perform interpolation on other attributes.

* * * * *